Sept. 24, 1935.  E. H. TAYLOR  2,015,246
WELDING OUTLET
Filed Dec. 26, 1933   2 Sheets-Sheet 1

Inventor:
Edward Hall Taylor
By: Brown, Jackson, Boettcher & Dienner
Attys.

Inventor:
Edward Hall Taylor

Patented Sept. 24, 1935

2,015,246

UNITED STATES PATENT OFFICE 2,015,246

WELDING OUTLET

Edward Hall Taylor, Oak Park, Ill.

Application December 26, 1933, Serial No. 703,910

2 Claims. (Cl. 285—106)

This invention relates to pipe fittings, and has to do with an outlet fitting intended for welding to a pipe or analogous structure.

In connecting a branch pipe to a main, it is a common practice to cut an opening in the main pipe by means of an acetylene torch, this opening being cut in such manner that the edge thereof is beveled downward and inward of the pipe, after which a fitting, the end of which is beveled upward and outward of the pipe, is seated about the opening and welded to the pipe. The branch pipe is then welded or otherwise suitably secured to the outer end of the fitting. It is difficult to cut the opening in the main pipe with accuracy and the end of the fitting has edge contact only with the pipe adjacent the opening therein. During the welding of the fitting to the pipe, weld metal flows between the edge of the fitting and the pipe and thence to the edge of the opening from which it flows downward into the pipe and congeals, forming metal elements which project into the pipe, commonly termed "icicles". These icicles collect various materials in the liquid or fluid which flows through the main pipe, with the result that flow from the main pipe into the branch pipe is seriously impaired and in some instances may be completely stopped. A further objection to the present practice, above referred to, is that the wall at the inner edge of the opening forms an abrupt shoulder which interferes with free flow of the contents of the main pipe into the fitting.

When applying a fitting to a pipe in accordance with the present practice, it is necessary that openings of appreciable size between the edge of the fitting and the pipe be avoided, since the weld metal would flow freely through such openings forming large icicles and rendering the welding operation extremely difficult or impossible. This necessitates an accurate fit between the pipe and the end of the fitting. In order to assure this, the end of the fitting is shaped to provide, in effect, a saddle which seats edgewise upon the pipe about the opening therein, and this saddle is of necessity curved on the same radius as the exterior of the pipe. This means that a fitting must be provided for each size of pipe, whether the outlet opening in the pipe be the same in each instance or not. Consequently, under the present practice, it is necessary to keep on hand a large number of fittings for use with pipes of different sizes, which is objectionable for obvious reasons. Furthermore, each fitting must have its saddle end accurately formed and curved on the radius of the particular size of pipe to which such fitting is to be applied, which adds materially to the cost of producing a series of fittings for use with a corresponding series of pipes.

My invention is directed primarily to the provision of an outlet fitting which can be welded to a pipe with expedition and facility and which avoids the above noted objections to the present practice. More specifically, an object of my invention is to provide a fitting of improved construction suitable for use with a plurality of sizes of pipe, and provided with novel means for securing the fitting to the pipe in such manner as to eliminate the possibility of the formation of icicles about the opening in the pipe, while assuring free flow of the contents of the pipe into the fitting. Further objects and advantages of my invention will appear from the detail description.

In the drawings:—

Figure 1:
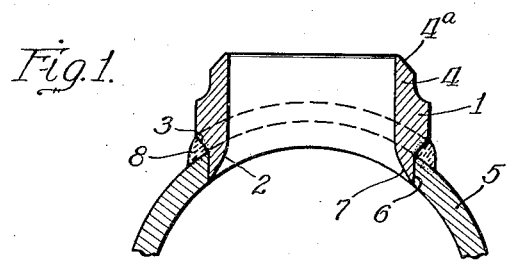
Figure 1 is a transverse vertical sectional view through an outlet fitting embodying my invention applied to a pipe, the pipe being shown fragmentarily.

The fitting is conveniently formed from metal suitable for welding, and comprises a cylindrical body 1 provided at one end with an element 2 of reduced exterior diameter, there being a shoulder 3 extending outward from the inner end of element 2, this shoulder preferably being inclined at an angle suitable for welding. At its other end the fitting is provided with a neck 4, the outer end of which is beveled at 4a for welding to the end of a branch pipe. The particular formation of the end of the fitting remote from element 2 is not of the essence of this invention, and this end of the fitting may be formed variously, depending upon the manner in which the branch pipe is to be secured to the fitting. The shoulder 3 is curved toward the remote end of the fitting, from opposite sides thereof, to provide a saddle which conforms, in general, to the approximate curvature of the outer surface of a pipe to which the fitting is applied.

The fitting is intended for use with a main pipe 5, or analogous structure. This main pipe is provided with an opening 6 of proper size and shape to receive snugly element 2 of the fitting. This opening 6 is conveniently formed by boring or sawing through the wall of the main pipe and the surface defining the opening is so disposed that any line extending transversely of and perpendicular to this surface lies within the plane of a chord of the main pipe 5.

In Figure 1, the outer surface of pipe 5 is curved on the same radius as shoulder 3 of the fitting. The outer circumferential surface of element 2 is disposed in parallel contacting relation to the surrounding surface of opening 6, and the lower edge of shoulder 3 seats upon the pipe about opening 6, when element 2 is fully inserted into the opening, thus providing a closure between the body 1 of the fitting and the pipe 5. The shoulder 3 limits the extent to which element 2 is inserted into opening 6 and cooperates with this element and with pipe 5 for supporting the fitting in position for welding. Since the opening 6 conforms accurately to the size and shape of the exterior of extension element 2 of the fitting, the fitting can be positioned with facility in accurate relation to the pipe, and is held in this position during the welding operation, which greatly facilitates and expedites positioning and welding of the fitting in proper relation to the pipe.

In Figure 1, element 2 of the fitting corresponds in length to the wall thickness of pipe 5 and the outer end of this element is curved similarly to the shoulder, so that this element and shoulder 3 conform in curvature to the curvature of the pipe wall. It will be further noted that element 2 tapers outward in thickness and has its inner surface 7 flared inward of pipe 5, preferably so that the lower edge of element 2 is quite thin and merges into the adjacent edge of the pipe wall defining the opening 6. Element 2 thus defines a flared opening of smooth contour leading from the main pipe into the fitting, which opening is free of all projections such as would tend to collect foreign materials in the liquid or fluid flowing from the main pipe 5 into the fitting.

Since the element 2 fits snugly within opening 6 of the pipe 5, and shoulder 3 contacts the outer surface of the pipe about opening 6, a double closure is provided between element 2 of the fitting and the pipe, which closure is effective for preventing molten metal from flowing about element 2 of the fitting and into the pipe 5 during the welding operation. With the fitting supported in proper relation to the pipe, in the manner previously described, shoulder 3 is welded to the pipe by means of welding metal 8 which is welded into the space between this shoulder and the pipe so as to fill the same, as shown. The inclination of shoulder 3, previously referred to, provides ample space for welding and facilitates the welding operation. This shoulder also cooperates with the welded-in metal 8 to reenforce the pipe 5 about the opening 6, which is advantageous in that this area of the pipe is subjected to severe stresses due to the change in direction of flow of the fluid in pipe 5 as it passes from the latter to the fitting.

Figure 2:
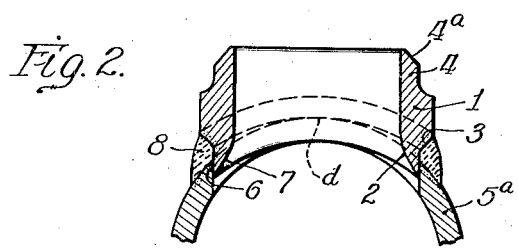
Figure 2 is a view similar to Figure 1, but showing the fitting applied to a pipe of less diameter than the pipe of Figure 1.

In Figure 2 the fitting is shown as applied to a pipe 5a of less diameter than pipe 5 of Figure 1. Since the curvature of pipe 5a is less than that of shoulder 3, this shoulder contacts the pipe at point d at the back of the fitting and at a corresponding point at the front of the fitting, the sides of the shoulder being disposed outward beyond the pipe as shown. The curvature of the saddle provided by shoulder 3 approximates the general curvature of the outer surface of the pipe, but is of greater radius. The result is that extension 2 is, in effect, moved slightly outward of opening 6, at the side portions of the fitting, but this extension fits snugly within opening 6 and forms a closure therewith effective to prevent flow of weld metal between the fitting and the pipe with resulting formation of icicles within the pipe. The space between shoulder 3 and pipe 5a is filled in with weld metal 8, in the operation of welding the fitting to the pipe, as before.

Figure 3:
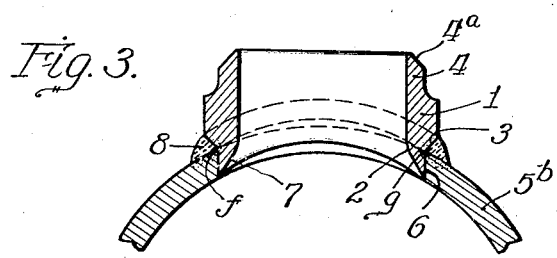
Figure 3 is a view similar to Figure 1, but showing the fitting applied to a pipe of greater diameter than the pipe of Figure 1.

In Figure 3 the fitting is applied to a pipe 5b of greater diameter than the pipe 5 of Figure 1. Shoulder 3 contacts the pipe at points f and g at opposite sides of the fitting, and the front and rear portions of the shoulder are disposed outward beyond the pipe, as will be clear from Figure 3. The space between the shoulder 3 and the pipe is filled in with weld metal 8, and the extension 2 of the fitting forms a closure with the surrounding wall of opening 6 effective to prevent flow of weld metal into the pipe, as above noted.

It will be seen that a fitting in accordance with my invention can be applied with expedition and facility to any one of a number of different sizes of pipes. This eliminates the necessity of keeping on hand a large number of fittings of different sizes, which is necessary under the present practice above referred to. Also, in using the fitting of my invention, the formation of icicles within the pipe is effectively prevented, which is an important consideration in this art.

The curvature of shoulder 3 of the fitting is important in that it materially increases the range of pipe sizes to which a given fitting can be applied. This will be clear from Figures 2 and 3. In Figure 2 the curvature of the saddle formed by shoulder 3 accommodates to a large extent the upward curvature of the upper portion of pipe 5a, and extension 2 projects into opening 6 for a considerable distance at the side portions of the fitting. If shoulder 3 were not curved in this manner, extension 2 would have to be of greatly increased length to fit into opening 6 of pipe 5a, and if the same fitting were applied to pipe 5 of Figure 1, or pipe 5b of Figure 3, extension 2 would project into the pipe for a considerable distance, which would be highly objectionable for obvious reasons. Furthermore, if shoulder 3 were not curved, the lateral portions of this shoulder would be spaced outward an excessive distance from the pipe, particularly when the fitting was applied to pipes of small radius, which would be objectionable as materially increasing the amount of weld metal used and rendering difficult the welding operation. It is apparent therefore that there is a distinct advantage in providing the curved shoulder 3, in conjunction with the relatively short extension 2, in the fitting of my invention.

Figure 4:
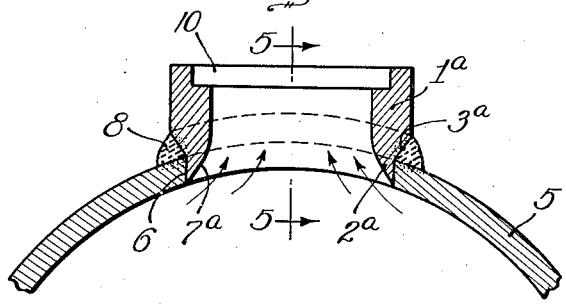
Figure 4 is a transverse vertical sectional view through a modified form of an outlet fitting embodying my invention applied to a pipe, the pipe being shown fragmentarily.
Figure 5:
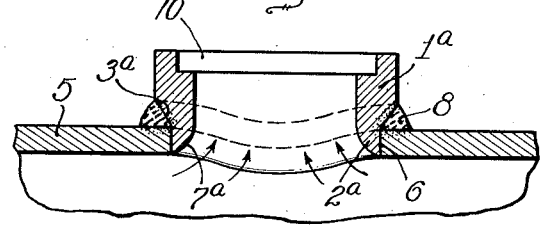
Figure 5 is a section taken substantially on line 5—5 of Figure 1.
Figure 6:
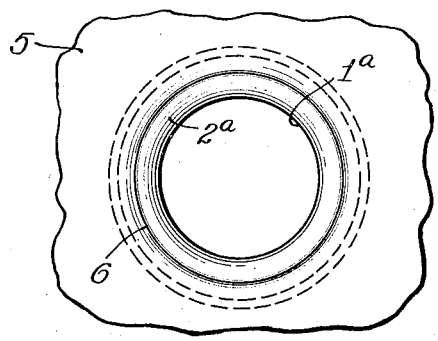
Figure 6 is an end view of the fitting of Figure 4 as applied, viewed from the interior of the pipe, the latter being shown fragmentarily.

The fitting illustrated in Figures 4 to 6 comprises a body 1a provided with a shoulder 3a and an extension 2a flared at 7a, and has a socket 10 at its upper end for reception of the end of a branch pipe. This fitting is shown as applied to a pipe 5 of the same radius as the radius of curvature of the front and the rear portions of the saddle provided by shoulder 3. The shoulder 3 is secured to the pipe 5 by being welded in metal 8, as before. The construction and use of this modified form of fitting are, in general, the same as the construction and use of the fitting of Figures 1 to 3, and need not be further described.

What I claim is:—

1. In combination, a pipe provided with an opening through its wall, and a fitting provided at one end with an element fitting snugly within said opening, said fitting having an exterior shoulder contacting the exterior surface of the pipe about the opening and curved toward the other end of the fitting and formed to provide a saddle approximating the curvature of the outer surface of the pipe, said shoulder being welded to said pipe, said element corresponding in length to the wall thickness of the pipe and having its end disposed within said opening of the same curvature as the inner end of the latter, the body of the fitting having a cylindrical bore and the inner surface of said element being flared inward of the pipe and defining a passage converging outward of the pipe and merging into the bore of the body of the fitting.

2. In combination, a pipe provided with an opening through its wall, and a fitting provided at one end with an element fitting within said opening, said fitting having an exterior shoulder contacting the exterior surface of the pipe about the opening and curved toward the other end of the fitting and formed to provide a saddle approximating the curvature of the outer surface of the pipe, said shoulder being welded to said pipe, the end of said element disposed within said opening being within the wall thickness of the pipe and approximating the curvature of the inner end of said opening, the body of the fitting having a cylindrical bore and the inner surface of said element being flared inward of the pipe and defining a passage converging outward of the pipe and merging into the bore of the body of the fitting.

EDWARD HALL TAYLOR.